United States Patent
Mohammad et al.

(10) Patent No.: US 11,573,977 B2
(45) Date of Patent: Feb. 7, 2023

(54) METHOD AND SYSTEM FOR MANAGING USER PROFILE INFORMATION ACROSS PLURALITY OF LOCATIONS IN REAL TIME

(71) Applicant: Semnox Solutions Private Limited, Manglore (IN)

(72) Inventors: Iqbal Mohammad, Mangaluru (IN); Kiran Karanki, Chennai (IN)

(73) Assignee: Semnox Solutions Private Limited, Manglore (IN)

( * ) Notice: Subject to any disclaimer, the term of this patent is extended or adjusted under 35 U.S.C. 154(b) by 102 days.

(21) Appl. No.: 17/421,344

(22) PCT Filed: Oct. 24, 2019

(86) PCT No.: PCT/IN2019/050782
§ 371 (c)(1),
(2) Date: Jul. 7, 2021

(87) PCT Pub. No.: WO2020/144705
PCT Pub. Date: Jul. 16, 2020

(65) Prior Publication Data
US 2022/0067064 A1    Mar. 3, 2022

(30) Foreign Application Priority Data
Jan. 8, 2019   (IN) .............................. 201941000902

(51) Int. Cl.
*G06F 16/00* (2019.01)
*G06F 16/27* (2019.01)
*H04W 4/029* (2018.01)
*G06F 16/9537* (2019.01)

(52) U.S. Cl.
CPC .......... *G06F 16/27* (2019.01); *G06F 16/9537* (2019.01); *H04W 4/029* (2018.02)

(58) Field of Classification Search
CPC .... G06F 16/27; G06F 16/9537; G06F 16/337; H04W 4/029; H04W 4/80; H04L 67/1095; H04L 67/306; H04L 67/52; G06Q 30/02
See application file for complete search history.

(56) References Cited

U.S. PATENT DOCUMENTS

| | | | |
|---|---|---|---|
| 8,086,491 B1 * | 12/2011 | Matz | G06Q 30/0269 705/14.66 |
| 8,903,819 B2 * | 12/2014 | Nichols | G06F 16/437 707/734 |
| 9,569,419 B1 * | 2/2017 | Rice | G06Q 30/0631 |

(Continued)

*Primary Examiner* — Noosha Arjomandi

(57) ABSTRACT

Method and system for managing user profile information across plurality of locations in real time Embodiments herein disclose a system and method for managing user profile information across a plurality of locations in real time. The method includes receiving, by a central server, usage information of a tag associated with a user and determining, by the central server, a zone associated with the user based on the usage information of the tag, where the zone indicates a plurality of locations associated with user. Further, the method includes automatically replicating, by the central server, a user profile information of the user and a tag data of the user into a local database of each of the locations indicated in the determined zone associated with the user.

12 Claims, 7 Drawing Sheets

(56) References Cited

U.S. PATENT DOCUMENTS

| | | | | |
|---|---|---|---|---|
| 9,569,549 B1* | 2/2017 | Jenkins | G06F 16/29 |
| 9,646,298 B2* | 5/2017 | Corbalis | G06Q 20/3278 |
| 10,134,044 B1* | 11/2018 | Shoemaker | G06Q 30/02 |
| 10,360,760 B2* | 7/2019 | Northrup | H04W 4/02 |
| 10,579,694 B1* | 3/2020 | Jenkins | G06F 3/0483 |
| 10,866,989 B1* | 12/2020 | Chandler | G06K 9/623 |
| 2002/0068585 A1* | 6/2002 | Chan | H04L 67/306 |
| | | | 455/456.1 |
| 2008/0140640 A1* | 6/2008 | Raff | H04W 4/02 |
| | | | 707/999.005 |
| 2010/0036806 A1* | 2/2010 | Lam | G06F 16/951 |
| | | | 707/706 |
| 2011/0070901 A1* | 3/2011 | Alward | G06Q 30/02 |
| | | | 455/466 |
| 2011/0145093 A1* | 6/2011 | Paradise | G06Q 30/02 |
| | | | 705/26.1 |
| 2011/0252021 A1* | 10/2011 | Clark | G06F 16/9535 |
| | | | 707/E17.011 |
| 2012/0084348 A1* | 4/2012 | Lee | G06Q 30/0261 |
| | | | 709/203 |
| 2012/0130823 A1* | 5/2012 | Levin | G06Q 30/0241 |
| | | | 705/14.69 |
| 2012/0144316 A1* | 6/2012 | Deng | G06Q 50/01 |
| | | | 715/751 |
| 2012/0166285 A1* | 6/2012 | Shapiro | G06Q 30/0261 |
| | | | 705/14.66 |
| 2017/0140019 A1* | 5/2017 | Ryngler | G06F 16/275 |
| 2020/0260223 A1* | 8/2020 | Reyes | H04L 51/04 |
| 2021/0011963 A1* | 1/2021 | Agnoli | G04G 21/00 |
| 2021/0044848 A1* | 2/2021 | Liu | H04L 65/612 |
| 2021/0118039 A1* | 4/2021 | Martin | G06F 21/602 |
| 2022/0067064 A1* | 3/2022 | Mohammad | G06Q 30/02 |
| 2022/0383260 A1* | 12/2022 | Palamadai | G06F 3/167 |

\* cited by examiner

METHOD AND SYSTEM FOR MANAGING USER PROFILE INFORMATION ACROSS PLURALITY OF LOCATIONS IN REAL TIME

The present disclosure relates in general to wireless communication, and more particularly to a method and system for managing a user profile information across a plurality of locations in real time. The present application is based on, and claims priority from an Indian Application Number 201941000902 filed on Jan. 8, 2019, and PCT/IN2019/050782 filed on Oct. 24, 2019 the disclosure of which is hereby incorporated by reference herein.

BACKGROUND

Field of Invention

With the advancement of technology and availability of huge amount of user data, various industries use mechanisms to identify users and also process, store, share and use the user data. Generally tags are used to capture user data which are then stored in local servers. The tags are used to identify the users and an account associated with user at a location in real time. The tags are widely used in amusement industry and leisure industry.

Conventionally, in case of amusement organizations or business organizations that are spread across multiple locations in a huge geographical area, the IT infrastructure is distributed with local IT setups and databases present in each location. Data consolidation either does not occur in real-time or achieved using high-cost and complex techniques. For e.g., in many cases a user has to register multiple times in the multiple locations of the amusement organization or business organization. The multiple registration of the same user leads to the user profile information getting duplicated in each location, leading to unconsolidated view of the same user. Usually users are identified in the amusement organization or business organization using tags for example a radio-frequency identification (RFID) cards or wrist band. The user can also hold credit or point balance like a wallet in the user profiles created at the plurality of locations. For example, consider that an organization has 10 different outlets, then the user will have 10 different tags and 10 different user profiles with different credit points, coupon codes, and wallet balance which are also not shareable across locations. This can be annoying to the user since the user is not able to make full use of the wallet balance. Also there is no single identity to the user within the same organization.

In another example, consider an amusement organization with multiple locations across geographical areas which means a seamless flow of user information becomes a key requirement. The seamless flow of user information becomes a challenge when the facilities at the multiple locations are not interconnected and depend on simple IT infrastructures locally.

Thus, it is desired to address the above mentioned disadvantages or other shortcomings or at least provide a useful alternative.

OBJECT OF INVENTION

The principal object of the embodiments herein is to provide a method and system for managing a user profile information across a plurality of locations in real time.

Another object of the embodiments herein is to determine a zone associated with a user based on a usage information of a tag. Another object of the embodiments herein is to automatically replicate the user profile information of the user and a tag data of the user into a local database of each of the locations indicated in a determined zone associated with the user.

Another object of the embodiments herein is to receive the usage information of the tag at the input terminal of the location which is not available in the determined zone and automatically replicate the user profile information of the user and the tag data of the user into the local database of the location which is not available in the determined zone.

Another object of the embodiments herein is to receive an update to the user profile information at the input terminal of the location of the plurality of locations and automatically replicate the updated user profile information into the local database of each of the locations indicated in the determined zone associated with the user.

SUMMARY

Accordingly the embodiments herein disclose a system and method for managing user profile information across a plurality of locations in real time. The method includes receiving, by a central server, a usage information of a tag associated with a user and determining, by the central server, a zone associated with the user based on the usage information of the tag, where the zone indicates a plurality of locations associated with user. Further, the method includes automatically replicating, by the central server, the user profile information of the user and a tag data of the user into a local database of each of the locations indicated in the determined zone associated with the user.

In an embodiment, the usage information of the tag associated with the user comprises a unique identifier of the user, a plurality of locations visited by the user, a collection of entitlements usable across the plurality of locations by the user, usage details of the user tag used at an input terminal of each location of the user, and a zone preferences of the user.

In an embodiment, the method further includes detecting, by the central server, that the tag is used at an input terminal of a location which is not available in the determined zone and receiving, by the central server, the usage information of the tag at the input terminal of the location which is not available in the determined zone. Further, the method also includes automatically replicating, by the central server, the usage information in the local database of each of the locations indicated in the determined zone associated with the user.

In an embodiment, the method further includes detecting, by the central server, that the tag is used at an input terminal of a first location of the plurality of locations of the determined zone and receiving, by the central server, the usage information of the tag at the input terminal of the first location. Further, the method also includes automatically replicating, by the central server, the usage information in the local database of remaining locations of the plurality of locations indicated in the determined zone associated with the user.

In an embodiment, the user profile information is stored in the central server on an initial registration of the user and is automatically replicated at each of the local database of the determined zone associated with the user.

Accordingly the embodiments herein disclose a method for managing user profile information across a plurality of locations in real time. The method includes receiving, by an input terminal of a first location of a plurality of locations of a determined zone associated with a user, the user profile information of the user and a tag data of the user and storing, by the input terminal of the first location, the user profile information of the user and the tag data of the user in a local database. Further, the method also includes detecting, by the input terminal of the first location, a usage of the tag associated with the user at the input terminal of the first location by the user; and sending, by the input terminal of the first location, a usage information of the tag to a central server to replicate the usage information of the tag into the local databases of remaining locations of the plurality of locations.

Accordingly the embodiments herein disclose a central server for managing user profile information across a plurality of locations in real time. The central server includes a memory and a processor coupled to the memory. The processor is configured to receive usage information of a tag associated with a user and determine a zone associated with the user based on the usage information of the tag, where the zone indicates a plurality of locations associated with user. Further, the processor is also configured to automatically replicate the user profile information of the user and a tag data of the user into a local database of each of the locations indicated in the determined zone associated with the user.

Accordingly the embodiments herein disclose an input terminal of a first location of a plurality of locations of a determined zone associated with a user for managing user profile information in real time. The input terminal of a first location includes a memory and a processor coupled to the memory. The processor is configured to receive a user profile information of the user and a tag data of the user and store the user profile information of the user and the tag data of the user in a local database. Further, the processor is also configured to detect a usage of the tag associated with the user at the input terminal of the first location by the user; and send a usage information of the tag to a central server to replicate the usage information of the tag into the local databases of remaining locations of the plurality of locations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
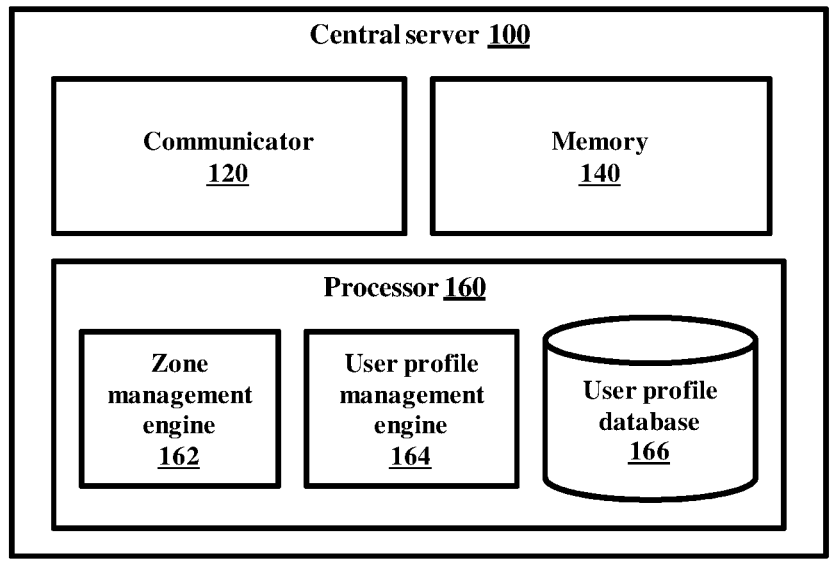
FIG. 1 illustrates a block diagram of a central server (100) for managing user profile information across a plurality of locations in real time, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a system and method for managing user profile information across a plurality of locations in real time. The method includes receiving, by a central server, a usage information of a tag associated with a user and determining, by the central server, a zone associated with the user based on the usage information of the tag, where the zone indicates a plurality of locations associated with user. Further, the method includes automatically replicating, by the central server, the user profile information of the user and a tag data of the user into a local database of each of the locations indicated in the determined zone associated with the user.

In the conventional methods and systems, local databases at various locations of a same firm are not interconnected and hence the user profile information of a user register at a first location may not be available at a second location. Therefore, the user is forced to re-register at the second location generating multiple profiles of the same user with the same firm.

In the conventional methods and systems, due to registration at the first location of the firm, the firm usually provides tags for identifying the user. Due to re-registration at the plurality of locations of the same firm, the user also procures multiple tags which may be unnecessary and cumbersome for the user to manage the same.

Unlike to the conventional methods and systems, in the proposed method the user registers only at the first location and the central server of the firm creates a user profile and the user is allocated a single tag for the firm. The same tag is used by the user at all the locations of the firm. Further, the usage of the tag information is updated in the central server of the firm based on the activity of the user at the multiple locations of the firm.

In the conventional methods and systems, the firms which have stores spread across a huge geographical area which are not interconnected may not share user profile information. Due to the absence of interconnection, the user may not be able to benefit from the various entitlements available in one location when the user visits the store in another location.

Unlike to the conventional methods and systems, in the proposed method all the stores of the firm which are in different locations are interconnected and hence the user profile information such as entitlements are made available to the user at all the locations.

In the conventional methods and systems, in case of connected stores of the firm at different locations the user is not allowed to select a zone based on user preference, a number of visits to a particular location, locations within proximity to the user location etc.

Unlike to the conventional methods and systems, in the proposed method the user is allowed to define the zone associated with the user based on the user preference, the number of visits to the particular location, the locations within proximity to the user location etc. Therefore, the user profile information may be made readily available at the locations which are defined in the zone.

In the proposed method the user profile information is not automatically shared with those locations which are not within the zone associated with the user. Therefore, sharing and storing of redundant information at the various locations of the firm is avoided.

The proposed method may be used in various areas such as such as entertainment industry which includes a conglomeration of amusement centers of a particular firm where the user can have a single tag and use the same tag to access the amusement centers at various locations. Further, the proposed method ensures that the user profile information such as wallet balance, coupon codes, etc at amusement center is available at all the amusement centers of the firm.

The proposed method may be used in hospitality industry where a chain of hotels, travel lodges, dining restaurants, travel modes etc at various locations are involved.

The proposed method may be used in a chain of hospitals especially in an era of medical tourism which will enable availability of medical records of a user at a plurality of locations which are inter-connected and can be accesses with the tags allocated to a particular user. Further, an update to the existing record can be automatically replicated in hospitals of those locations where the user frequently visits.

Referring now to the drawings and more particularly to FIGS. 1 through 8, where similar reference characters denote corresponding features consistently throughout the figure, these are shown preferred embodiments.

FIG. 1 illustrates a block diagram of a central server (100) for managing user profile information across a plurality of locations in real time, according to an embodiment as disclosed herein.

Referring to FIG. 1, the central server (100) includes a communicator (120), a memory (140) and a processor (160).

In an embodiment, the communicator (120) is configured to receive the usage information of a tag associated with a user from an input terminal (200) from at least one of the plurality of locations. The communicator (120) is also configured to send the user profile information of the user and the tag data of the user into the local database of each of the locations indicated in the determined zone associated with the user.

In an embodiment, the memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory (140). In certain examples, a non-transitory storage medium may store data that can, over time, change (e.g., in Random Access Memory (RAM) or cache).

In an embodiment, the processor (160) includes a zone management engine (162), a user profile management engine (164) and a user profile database (166).

The zone management engine (162) is configured to determine the zone associated with the user based on the usage information of the tag. The zone indicates a plurality of locations associated with the user. The zone management engine (162) determines the zone associated with the user based on the usage of the tag at one of the locations by the user. If the user uses the tag at the location which is within the zone associated with the user, then the user is within the zone and if the user uses the tag at the location which is not in the list of locations described in the zone associated with the user, then the user is out of the zone. For example, consider that the user is located in a first location and the plurality of locations which are in proximity to the first location include a second location, a third location, a fourth location, which forms the zone. In another example, the user may provide a list of locations which may be frequently visited by the user on roaming, which comprise the zone. The plurality of locations may be located in different parts of a county, different countries, different time zones, different continents, etc.

The user profile management engine (164) is configured to determine the location and the scenario when the user profile information needs to be replicated. The user profile management engine (164) automatically replicates the user profile information of the user and the tag data of the user into a local database of each of the locations indicated in the determined zone associated with the user, when the user uses the tag at the location which is within the determined zone associated with the user. The user profile management engine (164) is configured to automatically replicate the user profile information of the user and the tag data of the user into the local database of only the specific location, when the user uses the tag at the location which is out of the determined zone associated with the user.

Further, the user profile management engine (164) is also configured to determine an update to the existing user profile information based on the usage of the tag at the at least one location which may be one of within the determined zone and out of the determined zone. The user profile management engine (164) then automatically shares the updated user profile information with the input terminal of the at least location of the plurality of locations based on the location where the tag is used by the user.

The user profile database (166) is configured to store a plurality of user profiles. The user profile information includes a unique identifier of the user, a plurality of locations visited by the user, a collection of entitlements usable across the plurality of locations by the user, usage details of the user tag used at an input terminal of each location of the user, and zone preferences of the user.

Although the FIG. 1 shows the hardware elements of the central server (100) but it is to be understood that other embodiments are not limited thereon. In other embodiments, the central server (100) may include less or more number of elements. Further, the labels or names of the elements are used only for illustrative purpose and does not limit the scope of the invention. One or more components can be combined together to perform same or substantially similar function.

Figure 2:
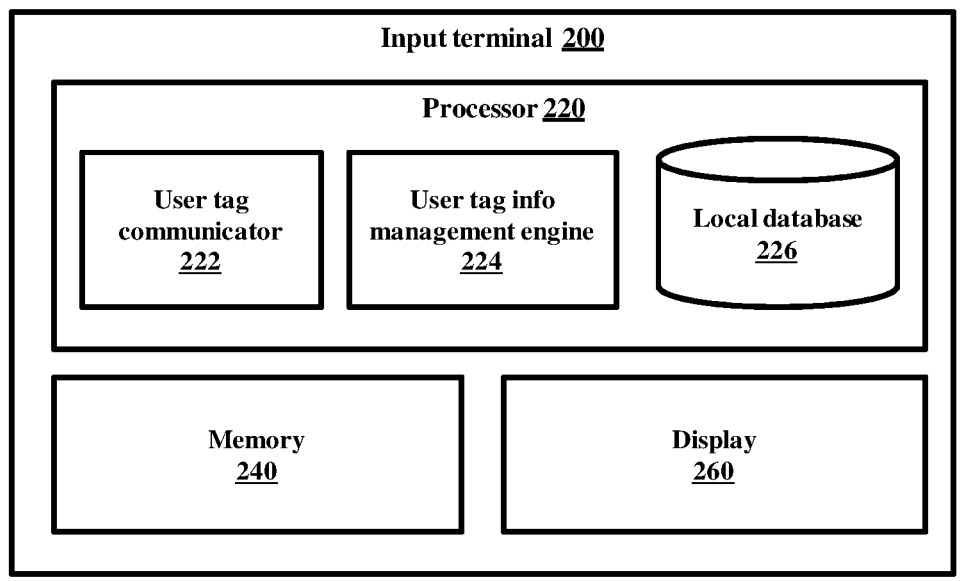
FIG. 2 illustrates a block diagram of an input terminal (200) for managing the user profile information across the plurality of locations in real time, according to an embodiment as disclosed herein.

FIG. 2 illustrates a block diagram of the input terminal (200) for managing the user profile information across the plurality of locations in real time, according to an embodiment as disclosed herein.

Referring to FIG. 2, the input terminal (200) includes a processor (220), a memory (240) and a display (260).

In an embodiment, the processor (220) includes a user tag communicator (222), a user tag info management engine (224) and a local database (226).

The user tag communicator (222) may include at least one of a biometric sensor, radio-frequency identification (RFID) tag reader, a smart label reader, a wrist band, etc which is used to input the user identity to the system using the user tag. The user tag acts as a unique identifier for the user and comprises at least one of Radio-Frequency Identification (RFID), one-dimensional (1D) barcode, two-dimensional (2D) barcode, phone, biometric, face recognition etc for uniquely identifying the user. Further, the user tag communicator (222) is also configured to receive the user profile information pushed down by the central server (100).

The user tag info management engine (224) is configured to share the user tag information/usage of the tag information with the central server (100) through internet linkages.

The local database (226) is configured to store the user tag information/usage of the tag information received at the input terminal (200). Further, the local database (226) is also configured to store the user profile information pushed down by the central server (100) based on the location of the input terminal (200).

In an embodiment, the memory (240) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (240) may, in some examples, be considered a non-transitory storage medium. The term "non-transitory" may indicate that the storage medium is not embodied in a carrier wave or a propagated signal. However, the term "non-transitory" should not be interpreted that the memory (240) is non-movable. In some examples, the memory (240) is configured to store larger amounts of information than the memory (240). In certain examples, a non-transitory storage medium may store data that can, over time, change (e.g., in Random Access Memory (RAM) or cache).

In an embodiment, the display (260) is configured to display the user interface to provide the tag data by the user at the time of initial registration with an organization which is hosting the system.

Although the FIG. 2 shows the hardware elements of the input terminal (200) but it is to be understood that other embodiments are not limited thereon. In other embodiments, the input terminal (200) may include less or more number of elements. Further, the labels or names of the elements are used only for illustrative purpose and does not limit the scope of the invention. One or more components can be combined together to perform same or substantially similar function.

Figure 3:
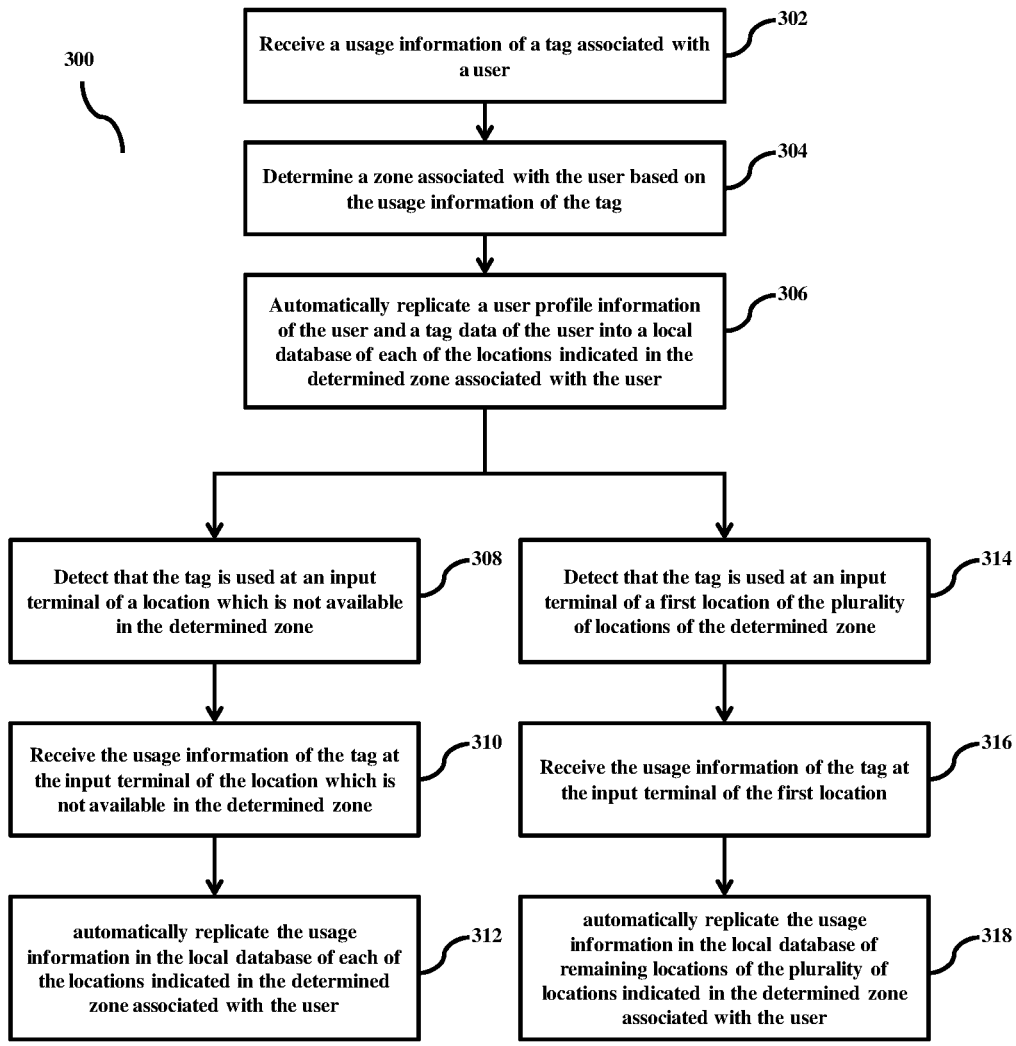
FIG. 3 illustrates a flow diagram of a method for managing the user profile information across the plurality of locations in real time by the central server (100), according to an embodiment as disclosed herein.

FIG. 3 illustrates a flow diagram 300 of a method for managing the user profile information across the plurality of locations in real time by the central server (100), according to an embodiment as disclosed herein.

Referring to the FIG. 3, at step 302 the central server (100) receives the usage information of the tag associated with the user.

For example, in the central server (100) as illustrated in the FIG. 1, the communicator (120) can be configured to receive the usage information of the tag associated with the user.

At step 304, the central server (100) determines the zone associated with the user based on the usage information of the tag. For example, in the central server (100) as illustrated in the FIG. 1, the processor (160) can be configured to determine the zone associated with the user based on the usage information of the tag.

At step 306, the central server (100) automatically replicates the user profile information of the user and the tag data of the user into the local database of each of the locations indicated in the determined zone associated with the user.

For example, in the central server (100) as illustrated in the FIG. 1, the processor (160) can be configured to automatically replicate the user profile information of the user and the tag data of the user into the local database of each of the locations indicated in the determined zone associated with the user.

At step 308, the central server (100) detects that the tag is used at the input terminal (200) of a location which is not available in the determined zone. For example, in the central server (100) as illustrated in the FIG. 1, the processor (160) can be configured to detect that the tag is used at the input terminal (200) of a location which is not available in the determined zone.

At step 310, the central server (100) receives the usage information of the tag at the input terminal (200) of the location which is not available in the determined zone. For example, in the central server (100) as illustrated in the FIG. 1, the processor (160) can be configured to receive the usage information of the tag at the input terminal (200) of the location which is not available in the determined zone.

At step 312, the central server (100) automatically replicates the usage information in the local database of each of the locations indicated in the determined zone associated with the user. For example, in the central server (100) as illustrated in the FIG. 1, the processor (160) can be configured to automatically replicate the usage information in the local database of each of the locations indicated in the determined zone associated with the user.

In another embodiment, at step 314, the central server (100) detects that the tag is used at the input terminal (200) of a first location of the plurality of locations of the determined zone. For example, in the central server (100) as illustrated in the FIG. 1, the processor (160) can be configured to detect that the tag is used at the input terminal (200) of a first location of the plurality of locations of the determined zone.

At step 316, the central server (100) receives the usage information of the tag at the input terminal of the first location. For example, in the central server (100) as illustrated in the FIG. 1, the processor (160) can be configured to receive the usage information of the tag at the input terminal of the first location.

At step 318, the central server (100) automatically replicates the usage information in the local database of remaining locations of the plurality of locations indicated in the determined zone associated with the user. For example, in the central server (100) as illustrated in the FIG. 1, the processor (160) can be configured to automatically replicate the usage information in the local database of remaining locations of the plurality of locations indicated in the determined zone associated with the user.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4:
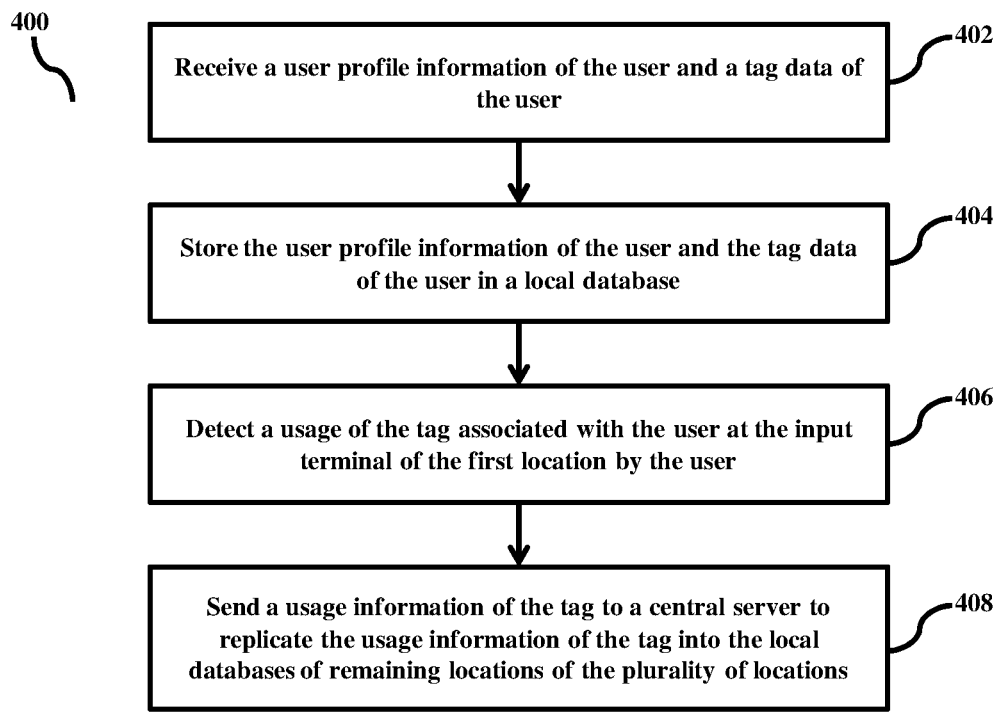
FIG. 4 illustrates a flow diagram for managing the user profile information in real time using the input terminal (200) of the first location of the plurality of locations of a determined zone associated with a user, according to an embodiment as disclosed herein.

FIG. 4 illustrates a flow diagram 400 for managing the user profile information in real time using the input terminal (200) of the first location of the plurality of locations of the determined zone associated with the user, according to an embodiment as disclosed herein.

Referring to the FIG. 4, at step 402, the input terminal (200) receives the user profile information of the user and the tag data of the user. For example, in the input terminal (200) as illustrated in the FIG. 2, the processor (220) can be configured to receive the user profile information of the user and the tag data of the user.

At step 404, the input terminal (200) stores the user profile information of the user and the tag data of the user in the local database. For example, in the input terminal (200) as illustrated in the FIG. 2, the processor (220) can be configured to store the user profile information of the user and the tag data of the user in the local database.

At step 406, the input terminal (200) detects the usage of the tag associated with the user at the input terminal of the first location by the user. For example, in the input terminal (200) as illustrated in the FIG. 2, the processor (220) can be configured to detect the usage of the tag associated with the user at the input terminal of the first location by the user.

At step 408, the input terminal (200) sends the usage information of the tag to the central server (100) to replicate the usage information of the tag into the local databases of remaining locations of the plurality of locations. For example, in the input terminal (200) as illustrated in the FIG. 2, the processor (220) can be configured to send the usage information of the tag to the central server (100) to replicate the usage information of the tag into the local databases of remaining locations of the plurality of locations.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
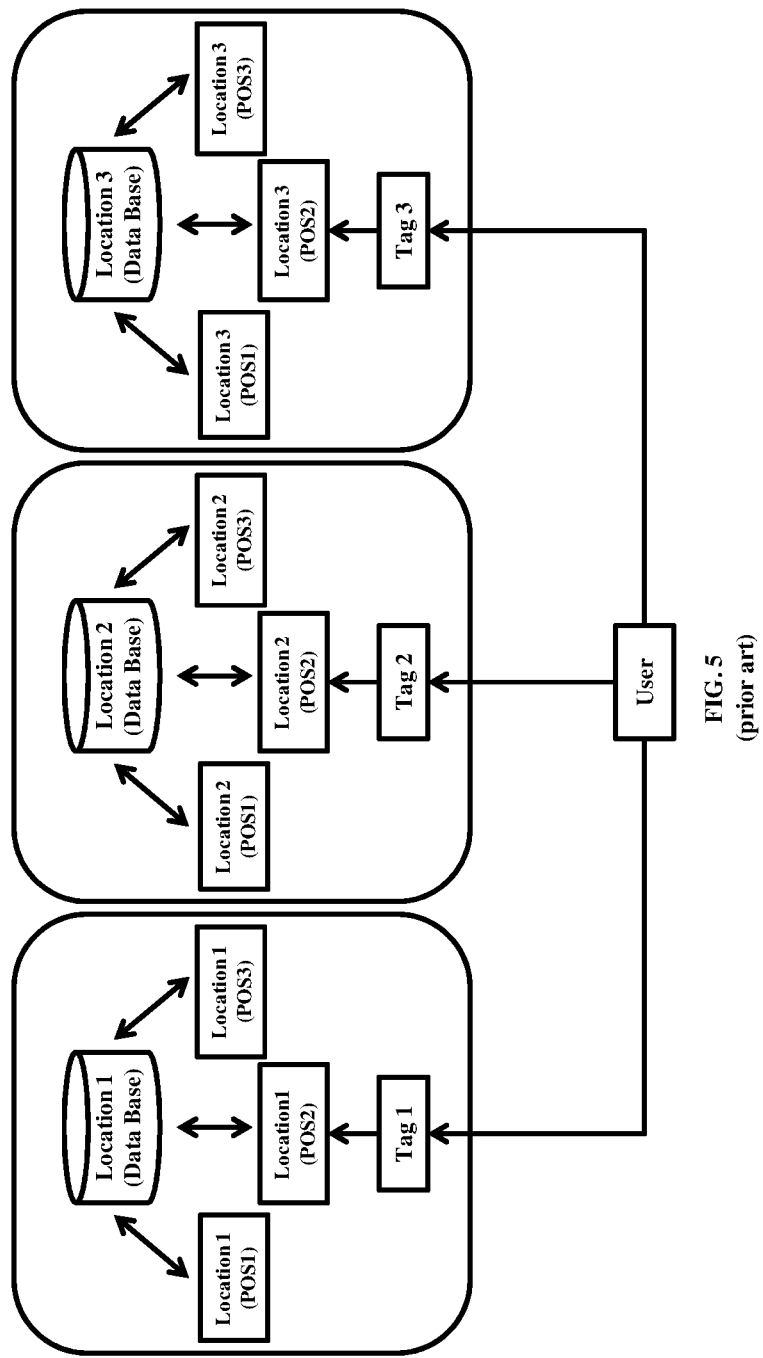
FIG. 5 is an example illustrating an existing mechanism of management of the user profile information across the plurality of locations which are not interconnected, according to prior art.

FIG. 5 is an example illustrating an existing mechanism of management of the user profile information across the plurality of locations which are not interconnected, according to prior art.

Consider a firm which sells products or services through a network of stores which are located in multiple locations across geographical areas. A user who wishes to buy products or services from the firm can avail the products or services from the input terminal (also referred to as a Point of Sale (POS) machine). The POS machine could be a manned POS counter or a self-service kiosk. Further, there could be a plurality of POS counters in one location of the firm. The firm at a specific location will be storing user data in the local database in the POS machine and the plurality of POS machines are connected to the local database.

Referring to the FIG. 5, consider that the user wants to buy a product from the location 1 of a firm X. The user registers at the location 1 by entering the details at the input terminal at the location 1 of the firm X such as name, contact information, date of birth, occupation, address, interest, etc. On registration, the firm X provides the user with the tag (e.g. an RFID tag which is unique to the user and identifies the user at the location 1 of the firm X). The user data gets stored in the local database of the input terminal (200) at the location 1 with the user tag used to identify the user during all the future visits to the location 1 of the firm X. The tag issued by the firm X to the user will refer to the used account in database that has user information such as name, contact information, date of birth, occupation, address, interest, credit points and such entitlements associated with the user account. The tag helps to identify the user accounts that hold credit or point balance like a wallet.

Consider that the user visits a store of the firm X to buy products or services for a second time but at location 2. In the conventional methods and systems, the user is required to again register at the location 2 and obtain a second tag to identify the same user who is registered at the location 1 of the firm X, since the input terminals at the plurality of locations are not interconnected. Further, in case the user visits a location 3, location 4, etc then the user is required to register multiple times at each of the locations of the firm X leading to the generation and procurement of multiple tags with multiple user accounts at the same firm X, which makes the user experience cumbersome. Further, the multiple user accounts of the same user will have different balances in each of the locations and the user is not able to take benefit of one of the wallet balance, a coupon code, etc which is available at one of the locations as the user account details and entitlements are not shareable across the locations.

Therefore, the absence of the interconnection of the plurality of locations of the same firm leads to an inefficient usage of the user profile data such as the wallet balance, credits, coupons, etc when the user is roaming and can hinder seamless user experience. In the perspective of the firm, the user data is being duplicated in each location the user visits and thereby consuming unnecessary storage space in the systems. Further, the duplication can be removed by manual consolidation of the user data which will acquire precious human resource or cost the firm dearly.

Figure 6:
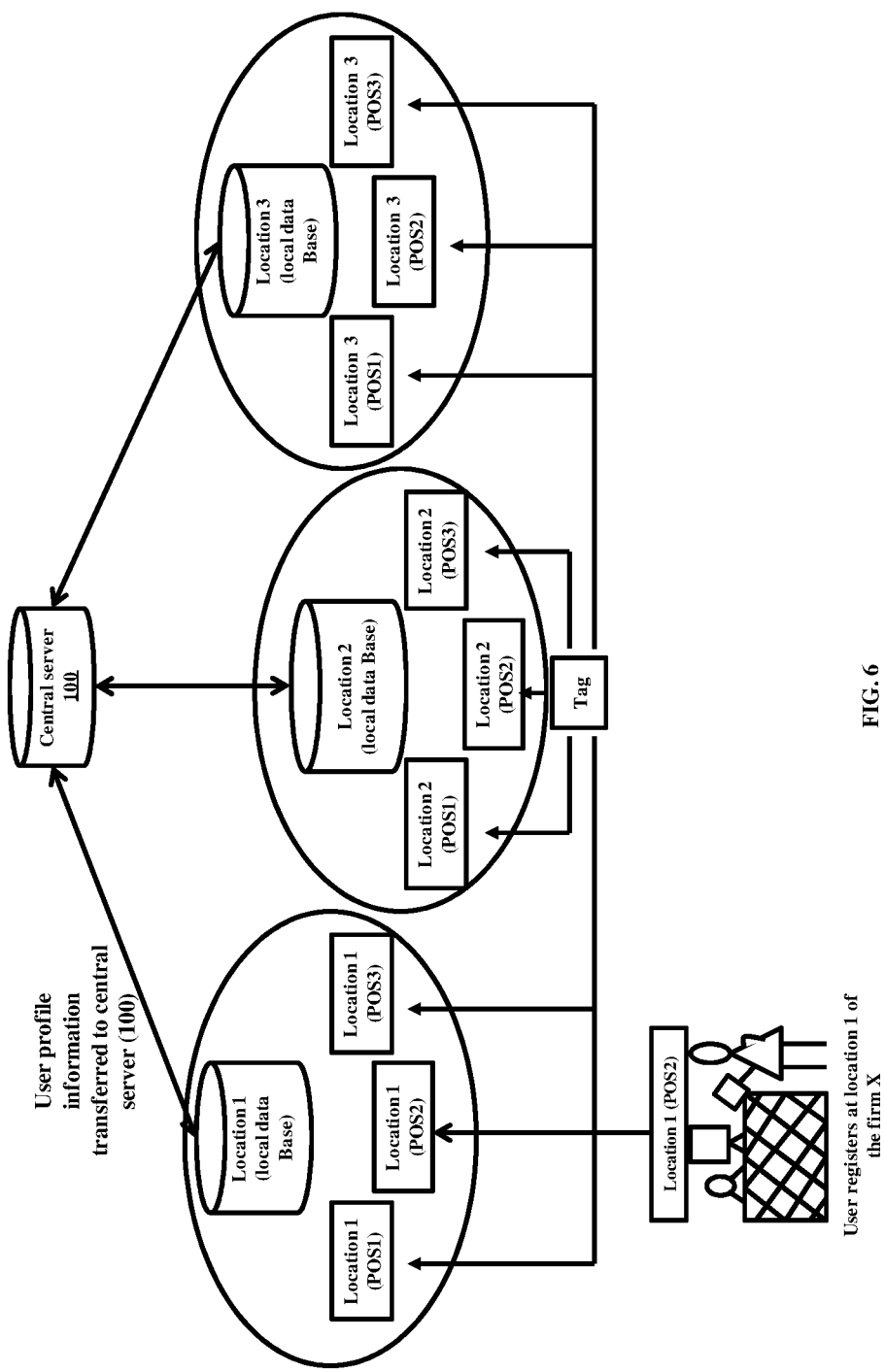
FIG. 6 is an example illustrating a method of providing the user profile information from across the plurality of locations of a firm to the central server (100), according to an embodiment as disclosed herein.

FIG. 6 is an example illustrating a method of providing the user profile information from across the plurality of locations of the firm to the central server (100), according to an embodiment as disclosed herein.

Referring to the FIG. 6 in conjunction with the FIG. 5, consider that the plurality of the input terminals (200) from the plurality of locations are connected to the central server (100), which may be a cloud server or is located in a head quarter office of the firm which is connected to the local servers of each location of the firm through the internet.

When the user registers at the location 1 of the firm X, the user profile information and the tag data is created only in the local database of the local server of the location 1 of the firm X. While providing the user profile information, the user is allowed to specify the zone associated with the user which indicates the plurality of locations associated with user. Consider the zone associated with the user includes the location 1, the location 2, the location 5 and the location 8 of the firm X.

Further, the user profile information and the tag data from the location 1 is pushed to the central server (100) by the local server of the location 1 though the internet. At the central server (100) the user profile information and the tag data received from the local server of the location 1 is stored for future reference. Similarly, the central server (100) receives the user profile information and the tag data for the plurality of users from the plurality of locations of the firm X.

The central server (100) enables the user data to be available to the local databases of the plurality of locations even though the user is registered only at the location 1. Further, the storage of user data in the central server (100) enables the firm X to have a consolidated view of the user data and thus avoid the disadvantage of manual consolidation and huge storage space requirement. The interconnection between the local servers of the plurality of locations through the central server (100) helps the user to have a single tag to access the plurality of locations of the firm X and other entitlements associated with the user profile such as the wallet balance, credit points, coupons, etc which are available to the user at the location 1 is shareable across the plurality of locations of the firm X as there is only single user profile information which is made available throughout the plurality of locations of the firm X.

Figure 7:
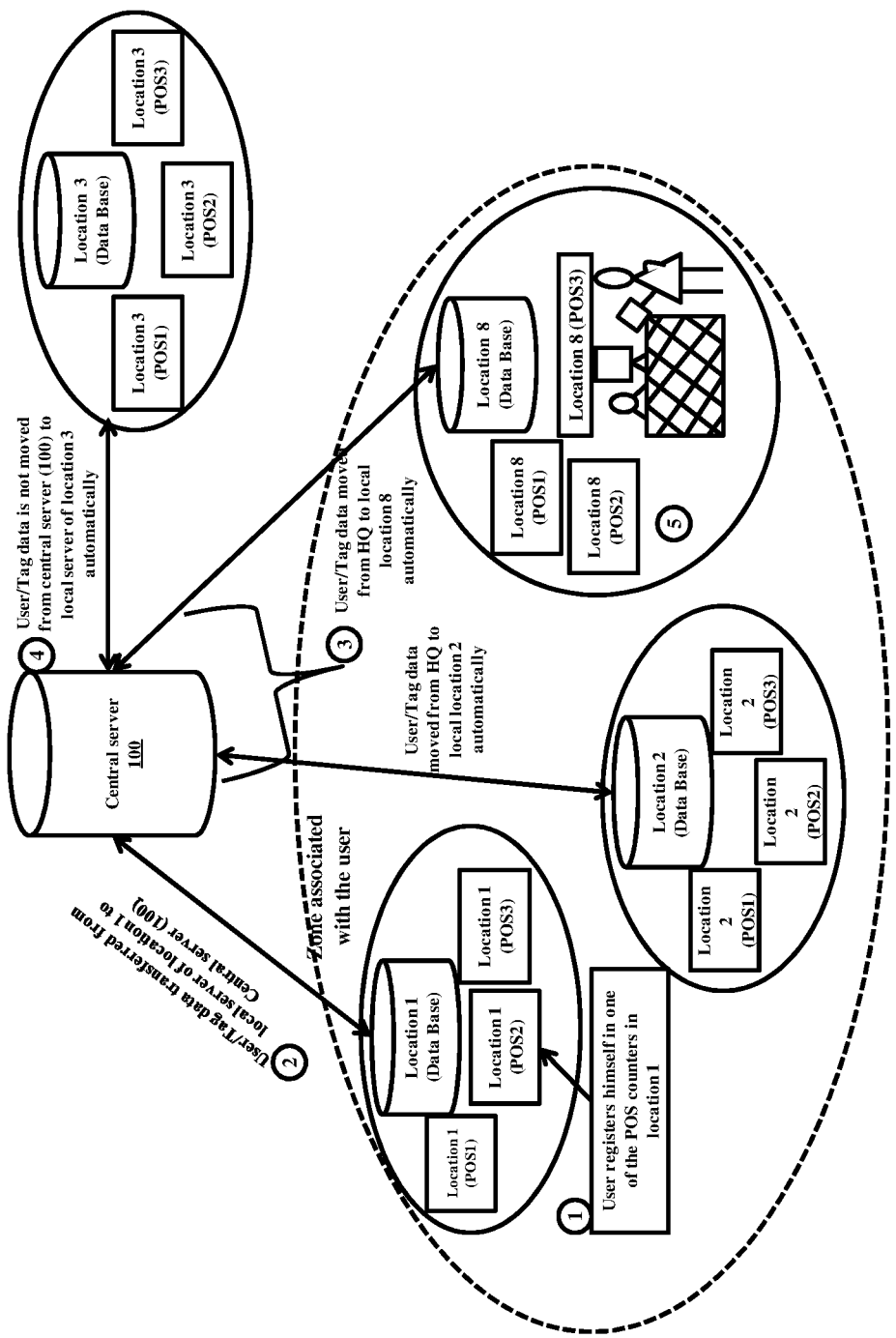
FIG. 7 is an example illustrating a method of providing the user profile information by the central server (100) to local server of the plurality of locations within a zone associated with the user, according to an embodiment as disclosed herein.

FIG. 7 is an example illustrating a method of providing the user profile information by the central server (100) to the local server of the plurality of locations within the zone associated with the user, according to an embodiment as disclosed herein.

Referring to the FIG. 7, in conjunction with the FIG. 6, at step 1, the user provides the user profile information while registering at the location 1 of the firm X and has defined the zone associated with the user which includes the location 1, the location 2, the location 5 and the location 8 of the firm X. At step 2, the user profile information provided by the user to the local server at the location 1 is sent to the central server (100) after storing a copy of the user profile information at the local server at the location 1.

At step 3, the central server (100) receives the user profile information and the tag data of the user from the local server of the location 1 and determines the zone provided by the user in the user profile information and the tag data of the user. Further, the central server (100) automatically replicates the user profile information and the tag data of the user in the plurality of locations which are included in the zone associated with the user. Therefore, the central server (100) replicates the user profile information and the tag data of the user in the location 2, the location 5 and the location 8 of the firm X.

Consider the location 3 of the firm X which is not within the zone defined by the user. The central server (100) does not automatically replicate the user profile information and the tag data of the user in the location 3 of the firm X since the location 3 of the firm X is not within the zone defined by the user (as shown in step 4).

At step 5, consider that the user visits the location 8 of the firm X and uses the tag for identification at the input terminal of the location 8. The local server at the location 8 already possesses the user profile information and the tag data of the user since the location 8 is within the zone associated with the user. The user performs the required purchases and the transactions for which the entitlements associated with the user profile such as the wallet balance, credit points, coupons, etc from the location 1 are carried forward and used since the local database of the local server at the location 8 already has the user profile information and the tag data of the user. Further, the local server at the location 8 also shares the details of the activities and transactions of the user performed at the location 8 to the central server (100). The central server (100) receives the usage information of the tag associated with the user from the local server at the location 8 based on transaction locks and determines an update in the user profile information and the tag data of the user based on the usage information of the tag at the location 8. Further, the central server (100) automatically shares the updated user profile information and the tag data of the user to the local servers of the plurality of locations defined in the zone associated with the user.

Hence each of the locations in the zone associated with the user receives a copy of the user profile information and the tag data of the user in near real-time of the registration of the user at the first local server. Also, if there is a new update on the user profile information and the tag data of the user either in the local database of the local server of the location 1 or in the plurality of locations within the zone associated with the user, the update on the user profile information and the tag data of the user is automatically propagated to all other locations by the central server (100). Therefore, the user profile information and the tag data of the user data is synchronized across the central server (100)

and the local servers of the plurality of locations within the zone associated with the user.

Conventional synchronization techniques that replicate data across a network requires infrastructure solutions that are fairly expensive to implement in terms of processing, hardware, network resources, maintenance and skilled personnel. In an embodiment of the invention the data is synchronized across multiple locations using a software driven technique, which is described as an incremental synchronization approach. Using this technique incremental data is generated using logs that track references to changed data. The table records have (1) a unique identifier or primary key in SQL Server and (2) a location identifier that is populated during the creation of the record. The tables have database triggers—embedded software instructions that are programed to execute when the underlying table data is manipulated such as with new data, an update to existing records or the deletion of a record. As such the trigger fires or are executed on data manipulation language operations (Insert/Update/Delete) on them. These triggers log the changed record identifiers into a synchronization log table ("synch log table") along with a timestamp. It will create time window with starting time from last synch time for the location, and a static end time calculated based on batch size defined by user. All changes done during the time window are available in the synch log table.

An incremental synchronization engine at a central server polls or periodically queries the synch log table maintained at each remote server and retrieves the table data using record identifiers. If the engine detects that a record in the database has been changed or updated, the data synchronization step proceeds, A dataset containing changed records from changed tables is created by retrieving the column values using record identifiers. Next, any foreign key values are replaced by new record identifiers in the parent records.

In response to a further instruction from the synchronization engine, the dataset is uploaded to a destination server, which may be a central server or located on the cloud. The dataset that has been generated is then sent to the destination server using a standard communication protocol such as SOAP. The destination server has an identical database as the local database and serves as the reference. At the destination server, the dataset reconstruction using dynamic table descriptions available in the local database is performed. Any columns missing in the destination database, as compared to the table definition of inbound dataset, are ignored. Every record if found in the destination table is updated or otherwise inserted. Data is synchronized in the order of relational hierarchy to maintain referential integrity during synchronization. Actual foreign key values are retrieved from parent tables using record references present in dataset and corresponding column names. The last synchronization time is updated in a synch reference table for the given location and stored.

The technique disclosed is 2-way and can be used for synchronization of local servers from the dataset stored at the central server using the same approach. Once the dataset is uploaded to central server, the software components on the central server generate a similar change data set for the location by accessing the synch log table in the central server. Based on the time window, a change dataset is created and downloaded to the location. A local synch engine processes the dataset and updates the local database.

This 2-way synchronization feature provides capabilities to drive changes from central server to a plurality of locations. It is particularly useful for new product launches, promotions, and price changes. New configurations and setup information can be pushed down from the central server to local database locations on an as needed basis. This enables users to manage businesses from corporate offices, centralizing control, and scale operations with easy deployment capabilities As discussed above, the synchronization process updates the database tables. These tables have database triggers to capture user changes. Conventional database management systems are not able to differentiate between changes caused by a synchronization process and a user changes, and thereby create synchronization log records even during synchronization data updates which leads to endless synchronization. To prevent this from happening, each record also has a field called SyncStatus which is updated to a value of '1' during the synchronization process. The database triggers see this value in the record and ignore such records. They also reset the value of SyncStatus to null.

As discussed above, there is a need to synchronize user profiles and their related account data, such as tag data, across multiple locations. When a change in the profile is made at a first location, this change must be updated throughout the system. The process for the same follows the basic approach of synchronization discussed above. When user data is updated in one location, it is uploaded to central server. If this data is required to be synchronized to another location, synchronization logs are created for each of the user profile data records with the location id column updated with the target location. The synch engine of each of the target location picks up the records meant for it by looking into the synch log table.

In case of a failure of an instance of a synchronization, the whole process may be restarted without any loss of information or integrity. Since the approach uses a time-window to generate dataset, the time-window does not move forward in case of a failure FIG. 8 is an example illustrating a method for managing the user profile information when the user uses the tag at one of the locations which is not within the zone associated with the user by the central server (100), according to an embodiment as disclosed herein.

Figure 8:
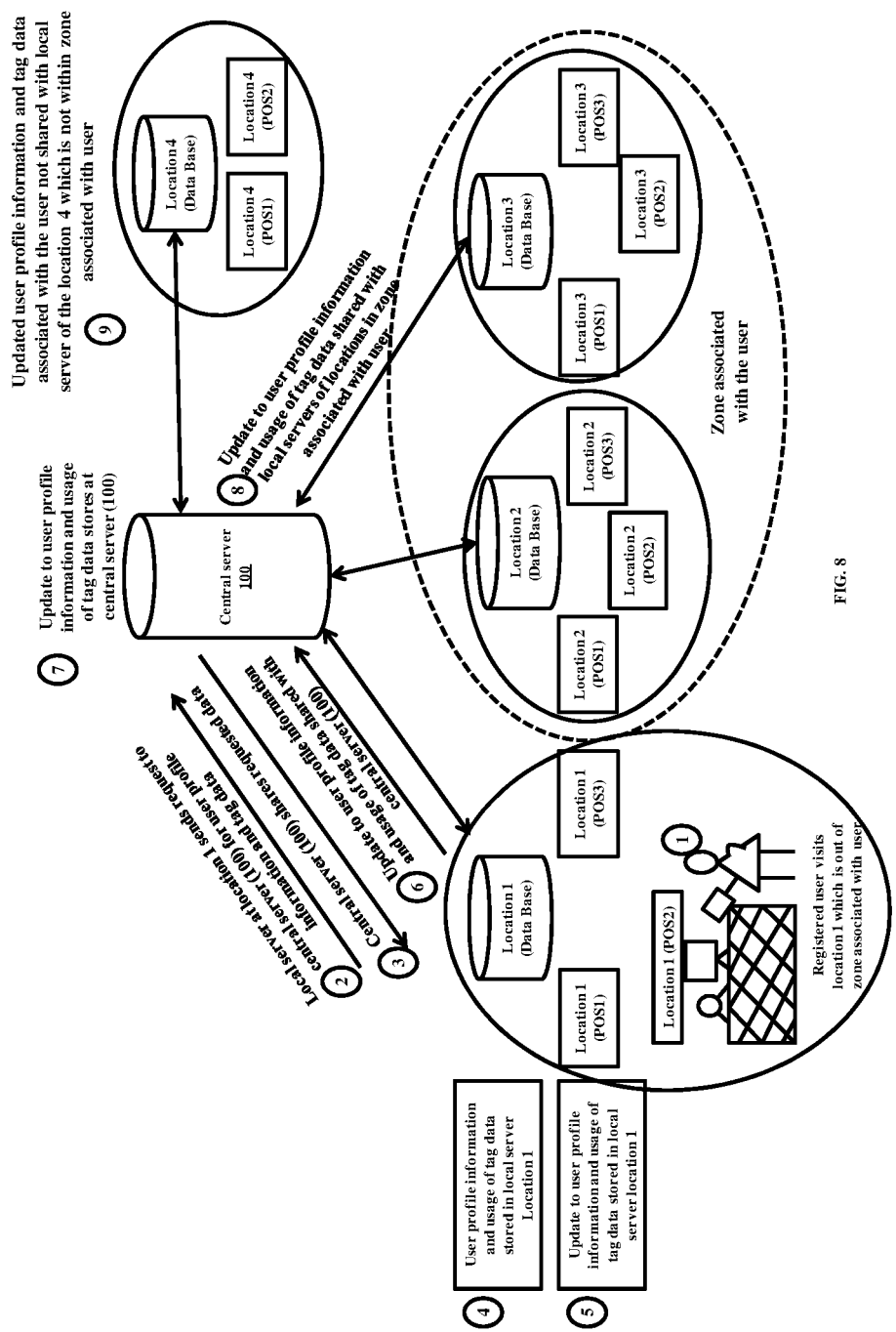
FIG. 8 is an example illustrating a method for managing the user profile information when the user uses a tag at one of the locations which is not within the zone associated with the user by the central server (100), according to an embodiment as disclosed herein.

Referring to the FIG. 8, in conjunction with the FIG. 6, consider the zone associated with the user includes the location 2 and the location 3. But the location 1 is not within the zone associated with the user. Also, consider that the user profile indicates that the user's birthday is in current month and hence the user is entitled to a 10% discount on the transactions, which can be availed only once.

At step 1, consider that the user who is registered at the location 3 of the firm X visits the location 1 of the firm X and makes transactions at the POS 2 of the location 1 using the tag.

At step 2, the local server of the location 1 communicates with the central server (100) and makes a request to pull the user profile information and the tag data from the central server (100). The central server (100) determines that the usage of the tag information by the user and the request for the user profile information is received from the location 1, which is not within the zone associated with the user. The locations which are out of the zone associated with the user are locations which may not be frequently visited by the user or not of interest to the user.

Further, at step 3, the central server (100) shares the requested information with only the local server of the location 1 according to the synchronization process described above. At step 4, the local server of the location 1 stores the user profile information and the tag data shared by the central server (100) and determines that the user is entitled to a 10% discount which can be availed only once. Further, at step 5, the local server of the location 1 processes the transactions of the user and provides the 10% discount on the user transactions based on the data received from the central server (100). However, the local server of the location 1 also updates the user profile information and the tag data indicating that the user has already utilized the 10% discount available and hence the user may not be entitled to utilize the 10% discount again.

At step 6, the local server of the location 1 shares the updates to the user profile information and the tag data with the central server (100). Therefore, the central server (100) is in sync with the local server of the location 1 with the updates to the user profile information and the tag data.

At step 7, the central server (100) updates the user profile information and tag data stored in the central server (100). At step 8, the central server (100) automatically shares the updated user profile information and tag data associated with the user with the local server of the location 2 and the local server of the location 3 that are within the zone associated with the user.

However, as indicated in step 9, the central server (100) does not share the updated user profile information and tag data associated with the user with the local server of the location 4 which is not within the zone associated with the user.

The user profile information and the tag data flow from one location to another location on need or on demand basis through the central server (100). Therefore, the proposed method reduces redundant information being loaded at individual locations which may not be of interest to the user. However, the proposed method also ensures that the usage information of the tag of the user at a location out of the zone associated with the user should be made available to the central server (100).

The sharing of the user profile information and the tag data from the central server (100) with the local servers of the locations which are not within the zone associated with the user in real time needs a stable internet connection at the locations where the user visits to pull the user profile information and the tag data from the central server (100). The method as described in FIG. 8 is more suitable when the firm X has large number of stores spread across a huge geographical area (e.g. spread across countries), as the user profile information and the tag data synchronization across each location is not required and the user profile information and the tag data synchronization with the locations are done in real time on need basis.

The embodiments disclosed herein can be implemented through at least one software program running on at least one hardware device and performing network management functions to control the elements. The elements shown in the FIGS. 1a to 5c include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for managing user profile information across a plurality of locations in real time, comprising:
    storing, by a local database in a first local server at a first location from a plurality of locations, the user profile information, tag data, and zone information on an initial registration of a user, wherein the zone information comprises the plurality of locations visited or to be visited by the user;
    sending, by the first local server, the user profile information, the tag data, and the zone information to a central server;
    receiving, by the central server, the usage profile information, the tag data and the zone information from the first local server;
    automatically replicating, by the central server, the user profile information and the tag data of at local server available in remaining locations of the plurality of locations of a zone;
    receiving, by a second local server at a second location from the plurality of locations of the zone, a usage information of the tag data associated with the user;
    receiving, by the second local server, at least one query for data synchronization from the central server;
    sending, by the second local server, only the usage information of the tag data to the central server in response to receiving the at least one query;
    receiving, by the central server, the usage information of the tag data from the second local server; and
    synchronizing, by the central server, the usage information by replicating only the usage information of the tag data received from the second local server at the local server available in the remaining locations of the plurality of locations of the zone.

2. The method as claimed in claim 1, wherein the usage information of the tag associated with the user comprises a unique identifier of the user, the plurality of locations visited by the user, a collection of entitlements usable across the plurality of locations by the user, usage details of the user tag used at an input terminal of each location of the user, and a zone preferences of the user.

3. The method as claimed in claim 1, comprising: receiving, by a local server at a location which is out of the zone, a usage information of the tag data associated with the user; sending, by the local server, a request for user data to the central server;
    receiving, by the local server, the user profile information, and the zone information from the central server; receiving, by the local server, at least one query for data synchronization from the central server; sending, by the local server, only the usage information of the tag data to the central server in response to receiving the at least one query; receiving, by the central server, the usage information of the tag data from the second local server; and
    synchronizing, by the central server, the usage information by replicating only the usage information of the tag at all the local servers available in the zone.

4. The method as claimed in claim 1, wherein automatically replicating, by the central server, the user profile information and the tag data of at the local server available in remaining locations of the plurality of locations of the zone comprises: periodically polling the local database and retrieving a record identifier and a timestamp to determine if a data set has changed
and synchronization is necessary; and automatically replicating, by the central server, the user
profile information and the tag data of at the local server available in remaining locations of the plurality of locations of a zone in response to automatically replicating the user profile information
and the tag data of at the local server available in remaining locations of the plurality of locations of the zone.

5. A system for managing a user profile information across a plurality of locations in real time, comprising: a central server; a first local server located at a first location from a plurality of locations of a zone; and a second local server located at a second location from the plurality of locations of the zone, wherein the first local server comprises a local database configured to store the user profile information, tag data, and zone information on an initial registration of a user, wherein the zone information comprises the plurality of locations visited or to be visited by the user,
the first local server configured to send the user profile information, the tag data, and the zone information to a central server; the central server configured to: receive a usage profile information of the tag and the zone information from the first local server, and automatically replicate the user profile information and the tag data at local server available in remaining locations of the plurality of locations of a zone; wherein the second local server configured to: receive a usage information of the tag data associated with the user, receive at least one query for data synchronization from the central server, and send only the usage information of the tag data to the central server in response to receiving the at least one query; and wherein the central server configured to: receive the usage information of the tag data from the second local server, and synchronize the usage information by replicating only the usage information of the tag data received from the second local server at the local server available in the remaining locations of the plurality of locations of the zone.

6. The system as claimed in claim 5, wherein the usage information of the tag associated with the user comprises a unique identifier of the user, the plurality of locations visited by the user, a collection of entitlements usable across the plurality of locations by the user, usage details of the user tag used at an input terminal of each location of the user, and a zone preferences of the user.

7. The system as claimed in claim 5, wherein the local server, at a location which is out of the zone, configured to: receive a usage information of the tag data associated with the user; send a request for user data to the central server; receive the user profile information, and the zone information from the central server; receive at least one query for data synchronization from the central server; send only the usage information of the tag data to the central server in response to receiving the at least one query; receive the usage information of the tag data from the second local server; and synchronize the usage information by replicating only the usage information of the tag at all the local servers available in the zone.

8. The system as claimed in claim 5, wherein automatically replicate the user profile information and the tag data of at the local server available in remaining locations of the plurality of locations of the zone comprises: periodically poll the local database and retrieve a record identifier and a timestamp to determine if a data set has changed and synchronization is necessary; and automatically replicate the user profile information and the tag data of at the local server available in remaining locations of the plurality of locations of a zone in response to automatically replicating the user profile information and the tag data of at the local server available in remaining locations of the plurality of locations of the zone.

9. The method as claimed in claim 1, wherein synchronizing the usage information by replicating only the usage information of the tag data received from the second local server at the local server available in the remaining locations of the plurality of locations of the zone comprises: triggering, by the central server logging of a changed record identifiers and providing a timestamp into a synchronized log table; periodically polling the synchronized log table database and retrieving a record identifier and a timestamp to determine if a dataset has changed and synchronization is necessary; uploading the dataset form the local server to the central sever; and replacing by the central server, pre-stored dataset with a new dataset.

10. The method as claimed in claim 9, wherein the dataset is reconstructed at the central destination server using dynamic table descriptions available in the local database, and further the last synchronization time is updated in a sync reference table for the updated location.

11. The system as claimed in claim 5, wherein synchronizing the usage information by replicating only the usage information of the tag data received from the second local server at the local server available in the remaining locations of the plurality of locations of the zone comprises: triggering, by the central server logging of a changed record identifiers and providing a timestamp into a synchronized log table; periodically polling the synchronized log table database and retrieving a record identifier and a timestamp to determine if a dataset has changed and synchronization is necessary; uploading the dataset form the local server to the central sever; and replacing by the central server, pre-stored dataset with a new dataset.

12. The system as claimed in claim 5, wherein the dataset is reconstructed at the central destination server using dynamic table descriptions available in the local database, and further the last synchronization time is updated in a sync reference table for the updated location.

* * * * *